(12) United States Patent
Chu et al.

(10) Patent No.: US 8,891,194 B1
(45) Date of Patent: Nov. 18, 2014

(54) DISK DRIVE ITERATIVELY ADAPTING CORRECTION VALUE THAT COMPENSATES FOR NON-LINEARITY OF HEAD

(71) Applicant: Western Digital Technologies, Inc., Irvine, CA (US)

(72) Inventors: Sanghoon Chu, San Jose, CA (US); Richard K. Wong, San Jose, CA (US); Min Chen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/923,078

(22) Filed: Jun. 20, 2013

Related U.S. Application Data

(60) Provisional application No. 61/823,281, filed on May 14, 2013.

(51) Int. Cl.
  *G11B 21/02* (2006.01)
  *G11B 5/596* (2006.01)
  *G11B 5/58* (2006.01)

(52) U.S. Cl.
  CPC ........................................ *G11B 5/58* (2013.01)
  USPC ..... 360/75; 360/77.08; 360/77.02; 360/78.04

(58) Field of Classification Search
  None
  See application file for complete search history.

(56) References Cited

U.S. PATENT DOCUMENTS

| | | | |
|---|---|---|---|
| 5,946,158 A | 8/1999 | Nazarian et al. | |
| 5,982,173 A | 11/1999 | Hagen | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |

(Continued)

*Primary Examiner* — Andrew L Sniezek

(57) ABSTRACT

A disk drive is disclosed comprising a head actuated over a disk. A position y of the head is measured based on servo sectors, and the measured position y of the head is adjusted based on:

$$z1 = y + c1(y)$$

where z1 represents a first adjusted position and c1(y) represents first correction values. The first adjusted position z1 is adjusted based on:

$$z2 = z1 + c2(z1)$$

where z2 represents a second adjusted position and c2(z1) represents second correction values. The first and second correction values are combined based on:

$$c3(y) = c1(y) + c2(y + c1(y)).$$

The measured position y of the head is adjusted based on:

$$z3 = y + c3(y)$$

where z3 represents a third adjusted position comprising the adjustment based on c1(y) and the adjustment based on c2(y), and c3(y) represents third correction values.

20 Claims, 4 Drawing Sheets

(56) References Cited

U.S. PATENT DOCUMENTS

| | | |
|---|---|---|
| 6,347,018 B1 | 2/2002 | Kadlec et al. |
| 6,369,971 B1 | 4/2002 | Everett |
| 6,369,972 B1 | 4/2002 | Codilian et al. |
| 6,369,974 B1 * | 4/2002 | Asgari et al. ............... 360/78.14 |
| 6,421,198 B1 | 7/2002 | Lamberts et al. |
| 6,429,995 B1 | 8/2002 | Dobbek et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,768,606 B2 | 7/2004 | Helms |
| 6,768,609 B2 | 7/2004 | Heydt et al. |
| 6,775,091 B1 | 8/2004 | Sutardja |
| 6,788,483 B1 | 9/2004 | Ferris et al. |
| 6,791,785 B1 | 9/2004 | Messenger et al. |
| 6,795,268 B1 | 9/2004 | Ryan |
| 6,798,606 B2 * | 9/2004 | Tang et al. ............... 360/77.08 |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,167,336 B1 * | 1/2007 | Ehrlich et al. ............. 360/77.04 |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weersooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |

(56) References Cited

U.S. PATENT DOCUMENTS

| | | |
|---|---|---|
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,724,461 B1 | 5/2010 | McFadyen et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | Mcfadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

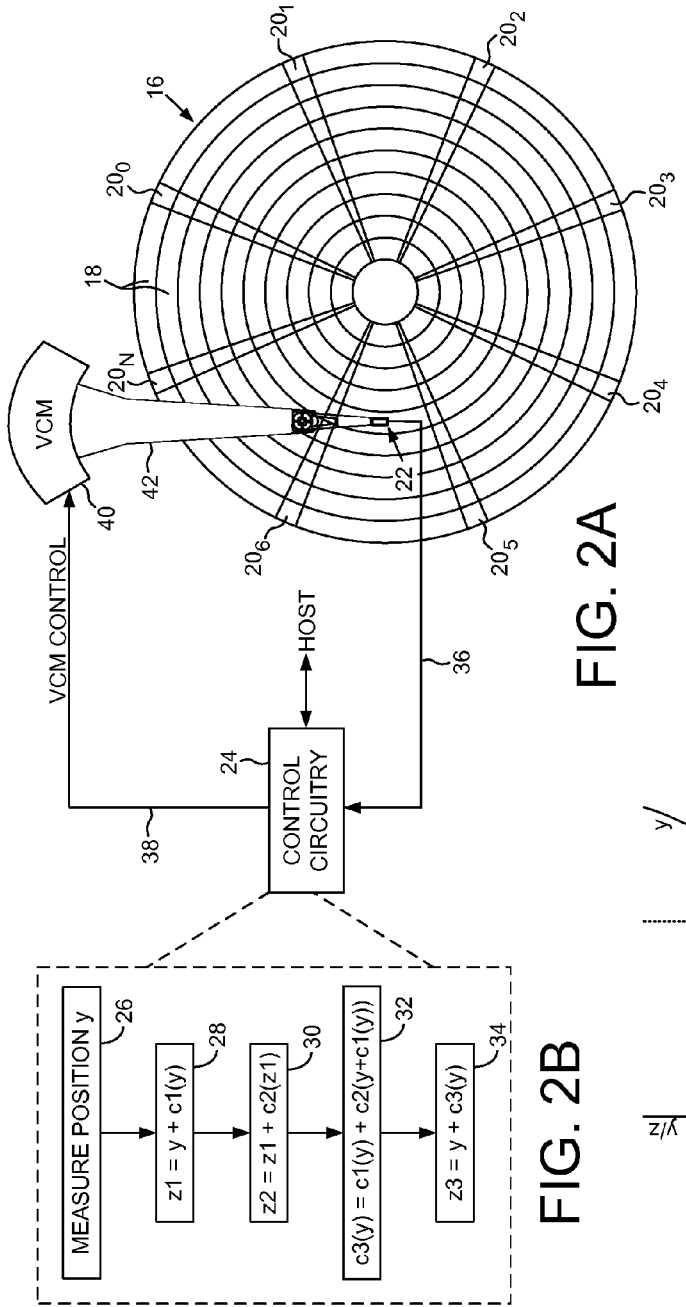

DISK DRIVE ITERATIVELY ADAPTING CORRECTION VALUE THAT COMPENSATES FOR NON-LINEARITY OF HEAD

CROSS-REFERENCE TO RELATED APPLICATIONS

This application claims priority to provisional U.S. Patent Application Ser. No. 61/823,281, filed on May 14, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Disk drives may employ a head having a suitable write element, such as an inductive coil, and a suitable read element, such as a magnetoresistive (MR) element. The read element may exhibit a non-linear response which may result in a non-linear PES measurement. That is, the measured PES relative to the actual head displacement from the centerline of the target servo track may exhibit a non-linear relationship. The prior art has compensated for this non-linearity by adjusting the measured PES based on a function that linearizes the PES. For example, U.S. Pat. No. 5,946,158 entitled "SELF-PES LINEARITY CALIBRATION METHOD FOR MR HEAD" teaches to adjust the PES based on:

$$z(y)=y+c(y)$$

where y represents the measured PES and c(y) represents a correction value that is computed based on a linearizing function.

BRIEF DESCRIPTION OF THE DRAWINGS

FIG. 2A shows a disk drive according to an embodiment comprising a head actuated over a disk, wherein the head comprises a read element that exhibits a non-linear response.

FIG. 2B is a flow diagram according to an embodiment, wherein correction values that correct the non-linearity are adapted in an iterative manner.

FIG. 2C illustrates a non-linear response of the head that may result in a non-linear relationship between an actual position x of the head, and a measured position y.

FIG. 4 illustrates an example where first correction values are represented as a first table and second correction values are represented by a second table which are combined to generate a third table of updated correction values.

DETAILED DESCRIPTION

Figure 1:
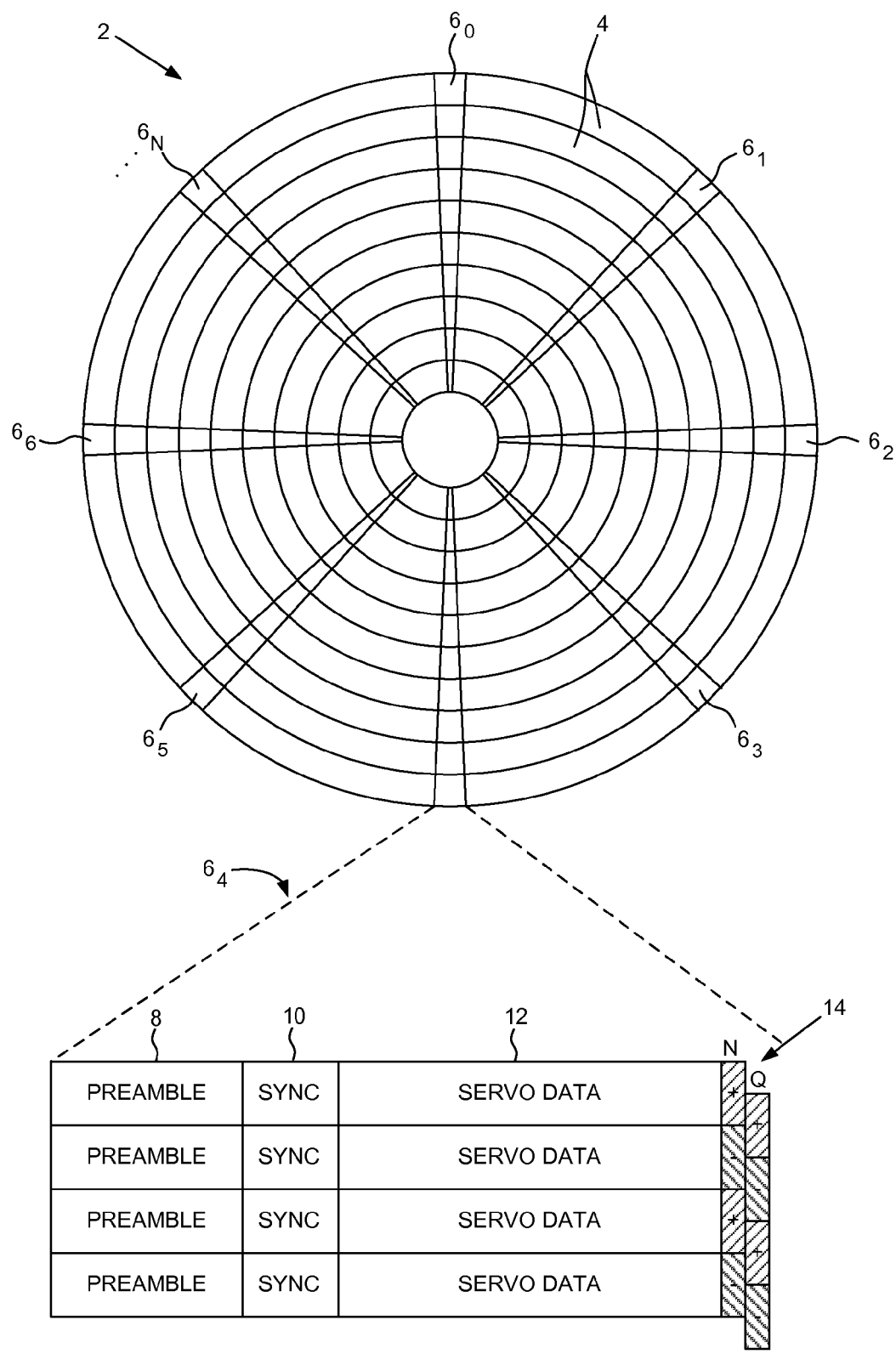
FIG. 1 shows a prior art disk format comprising a plurality of servo tracks defined by servo sectors.

FIG. 2A shows a disk drive according to an embodiment comprising a disk 16 with a plurality of servo tracks 18, wherein each servo track comprises a plurality of servo sectors $20_0$-$20_N$. The disk drive further comprises a head 22 actuated over the disk 16, and control circuitry 24 operable to execute the flow diagram of FIG. 2B. A position y of the head is measured based on the servo sectors (block 26), and the measured position y of the head is adjusted (block 28) based on:

$$z1=y+c1(y)$$

where z1 represents a first adjusted position and c1(y) represents first correction values. The first adjusted position z1 is adjusted (block 30) based on:

$$z2=z1+c2(z1)$$

where z2 represents a second adjusted position and c2(z1) represents second correction values. The first and second correction values are combined (block 32) based on:

$$c3(y)=c1(y)+c2(y+c1(y)).$$

The measured position y of the head is adjusted (block 34) based on:

$$z3=y+c3(y)$$

where z3 represents a third adjusted position comprising the adjustment based on c1(y) and the adjustment based on c2(y), and c3(y) represents third correction values.

In the embodiment of FIG. 2A, the control circuitry 24 processes a read signal 36 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 38 applied to a voice coil motor (VCM) 40 which rotates an actuator arm 42 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the correction values compensate for a non-linearity of the head 22. For example, in one embodiment the head 22 may comprise a non-linear read element (e.g., a magnetoresistive (MR) element) that exhibits a non-linear response to the polarity of magnetic transitions recorded on the disk 22. The non-linear response of the head 22 may result in a non-linear relationship between the actual position x of the head, and the measured position y, an example of which is shown in FIG. 2C. The non-linear relationship between the actual position x of the head and the measured position y induces an error in the PES which degrades the servoing accuracy of the control circuitry 24. Accordingly, in one embodiment correction values are generated and used to adjust the measured position y of the head to generate an adjusted position z having a more linear relationship with the actual position x of the head as shown in FIG. 2C.

Figure 3A:
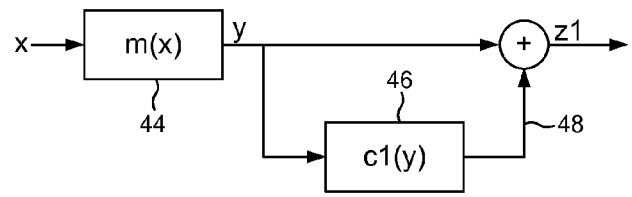
FIGS. 3A-3C show an embodiment for generating initial correction values for correcting the non-linearity of the read element, and adapting the correction values in an iterative manner.

FIG. 3A shows control circuitry according to an embodiment wherein a measured position y of the head is generated by block 44, such as by demodulating the read signal representing the servo bursts of a servo sector. Block 46 generates first correction values 48 based on the measured position y, and the measured position y is adjusted by the corresponding correction value 48 to generate a first adjusted position z1 that is better linearized. The block 46 for generating the first correction values 48 may be implemented in any suitable manner, such as with a linearizing function or with a table that represents the output of the linearizing function. In one embodiment, the linearizing function is first generated, and then a table is generated based on the linearizing function over a range of values for the measured position y. During normal operation, the table is indexed by the measured position y, and the corresponding correction value 48 used to adjust the measured position y.

The linearizing function for generating the correction values that linearize the measured position y of the head may be generated in any suitable manner. In one embodiment, the transfer function between the actual position x of the head and the measured position y may be represented as a variable gain relative to the displacement of the head from a centerline of a target track. In one embodiment, the head is displaced form the centerline until the measured position y reaches a predetermined value. The corresponding gain is then measured using any suitable technique, such as by injecting a sinusoid into the servo system and measuring the resulting response by computing a discrete Fourier transform. This process may be repeated for different values of the measured position y in order to generate a corresponding array of gains. The array of gains may then be evaluated to generate the linearizing function, for example, by computing coefficients of a Fourier series.

The first correction values 48 generated by block 46 of FIG. 3A may not sufficiently linearize the measured position y due to errors, for example, in generating the linearizing function. Accordingly, in one embodiment shown in FIG. 3B, the first adjusted position z1 may be further linearized by second correction values 50 generated by block 52 to generate a second adjusted position z2 that is further linearized. In one embodiment, the second correction values 50 may be generated based on a linearizing function similar to the first correction values 48. For example, the same technique described above for generating the linearizing function for the first correction values 48 may be used to generate the linearizing function for the second correction values 50 by replacing the measured position y with the first adjusted value z1. In this manner, the second correction values 50 compensate for the nonlinear response of block 54 in FIG. 3B, which includes the linearizing error of the first correction values 48.

Figure 3B:
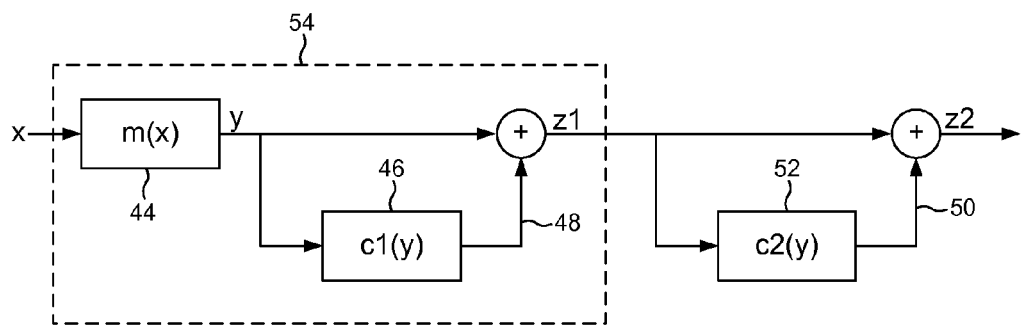
Figure 3C:
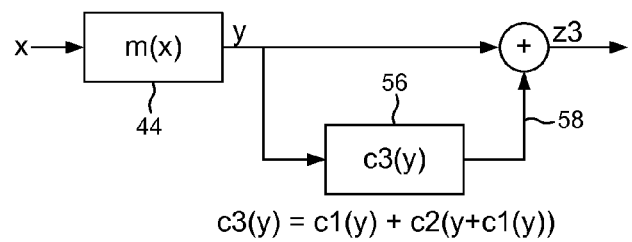

In one embodiment, after generating the second correction values 50 based on the linearizing function, block 46 and block 52 of FIG. 3B are combined into block 56 as shown in FIG. 3C. That is, the first and second correction values are combined based on:

$$c3(y)=c1(y)+c2(y+c1(y))$$

so that the measured position y of the head is adjusted based on:

$$z3=y+c3(y)$$

where z3 represents a third adjusted position comprising the adjustment based on c1(y) and the adjustment based on c2(y), and c3(y) represents the third correction values 58 generated by block 56. The above-described procedure may be iterated any suitable number of times to adapt the correction values until the correction values converge with sufficient accuracy. That is, block 46 of FIG. 3B may be replaced with block 56 of FIG. 3C in order to regenerate block 52 and so on. The iterations may continue until, for example, a predetermined number of iterations or until the average amplitude of the correction values 50 generated by block 52 falls below a predetermined threshold.

Referring again to FIG. 3C, the first correction values c1 and the second correction values c2 may be combined using any suitable technique. In one embodiment, the first correction values c1 are generated by a function of y, and the second correction values c2 are generated as a function of z1. The two functions may be combined so that the third correction values c3 may be generated based on a resulting function of y. That is, the correction values c3 may be generated based on the following function of y:

$$c3(y)=c1(y)+c2(y+c1(y))$$

where in one embodiment the above combined functions of y may be transformed mathematically into a single function of y.

Figure 4:
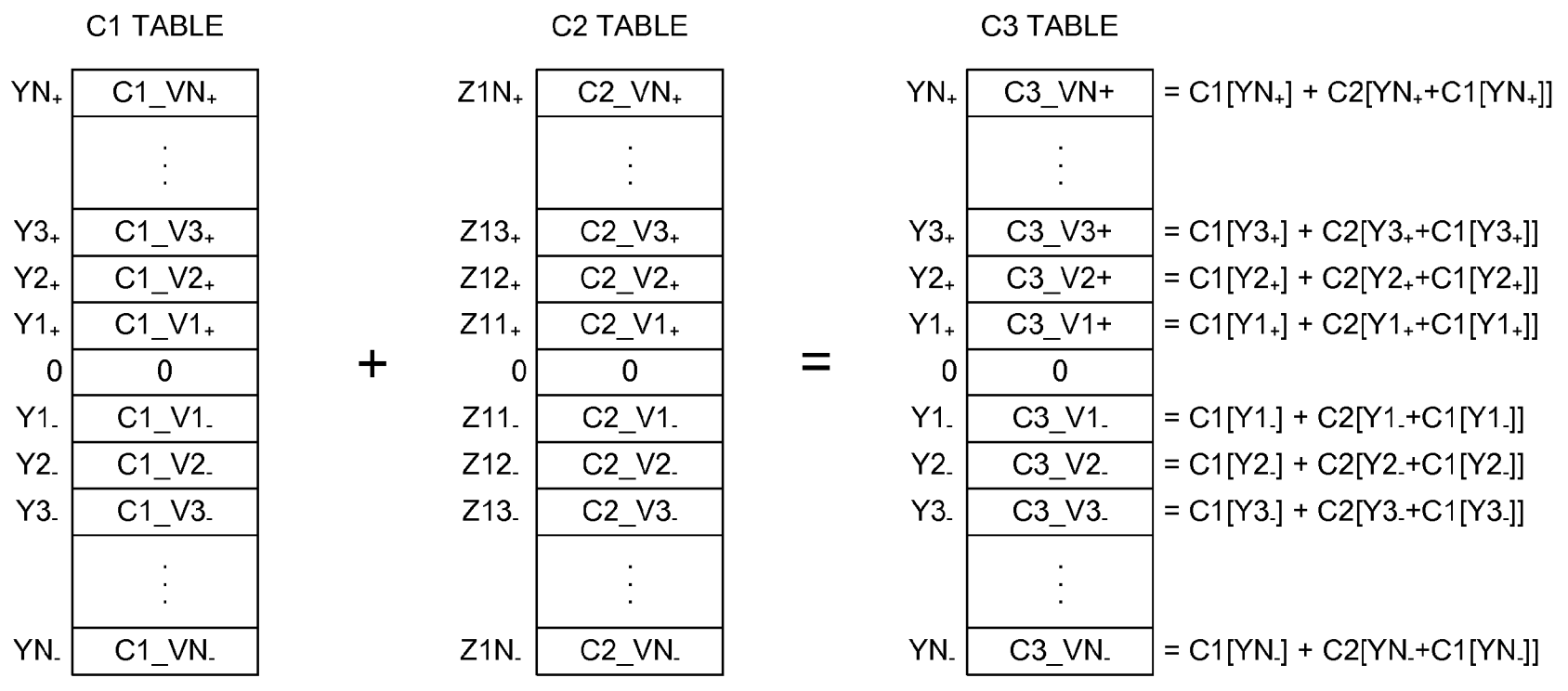

In another embodiment illustrated in FIG. 4, the first correction values c1 may be generated using a first table indexed by y, wherein the values of the first table may be generated based on a first linearizing function. The second correction values c2 may be generated using a second table indexed by z1=c2(y+c1(y)), wherein the values of the second table may be generated based on a second linearizing function. The correction values c3 may be generated using a third table indexed by y, wherein the values of the third table are generated as a combination of the values of the first and second tables. For example, for a specific value Y for the measured position y, the corresponding third table value for C3 is generated based on:

$$c3[Y]=c1[Y]+c2[Y+c1[Y]]$$

where c1[Y] represents the first table value and c2[Y+c1[Y]] represents the second table value. When performing the iterations to adapt the correction values, the first table of FIG. 4 is replaces by the third table, the second table is regenerated, and the two tables are again combined to generate a new third table.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising a plurality of servo tracks, wherein each servo track comprises a plurality of servo sectors;
    a head actuated over the disk; and
    control circuitry operable to:
        measure a position y of the head based on the servo sectors;
        adjust the measured position y of the head based on:

$$z1=y+c1(y)$$

where $z1$ represents a first adjusted position and $c1(y)$ represents first correction values;
        adjust the first adjusted position z1 based on:

$$z2=z1+c2(z1)$$

where $z2$ represents a second adjusted position and $c2(z1)$ represents second correction values;
        combine the first and second correction values based on:

$$c3(y)=c1(y)+c2(y+c1(y)); \text{ and}$$

adjust the measured position y of the head based on:

$$z3=y+c3(y)$$

where $z3$ represents a third adjusted position comprising the adjustment based on $c1(y)$ and the adjustment based on $c2(y)$, and $c3(y)$ represents third correction values.

2. The disk drive as recited in claim 1, wherein the control circuitry is further operable to actuate the head over the disk based on at least one of $c3(y)$ and z3.

3. The disk drive as recited in claim 1, wherein the first, second and third correction values compensate for a non-linearity of the head.

4. The disk drive as recited in claim 1, wherein c1 comprises a function of y, c2 comprises a function of z1, and C3 comprises a function of y.

5. The disk drive as recited in claim 1, wherein c1 comprises a first table indexed by y, c2 comprises a second table indexed by z1, and c3 comprises a third table indexed by y.

6. The disk drive as recited in claim 5, wherein the first table is generated using a function of y, the second table is generated using a function of z1, and the third table is generated by combining the first table and the second table.

7. The disk drive as recited in claim 6, wherein for a specific value Y for the measured position y, the corresponding third table value for C3 is generated based on:

$$c3[Y]=c1[Y]+c2[Y+c1[Y]]$$

where $c1[Y]$ represents the first table value and $c2[Y+c1[Y]]$ represents the second table value.

8. The disk drive as recited in claim 1, wherein the control circuitry is further operable to iteratively adapt the correction values.

9. The disk drive as recited in claim 8, wherein the control circuitry is further operable to iteratively adapt the correction values for a predetermined number of iterations.

10. The disk drive as recited in claim 8, wherein the control circuitry is further operable to iteratively adapt the correction values until an average amplitude of $c2(z1)$ falls below a threshold.

11. A method of operating a disk drive comprising a disk comprising a plurality of servo tracks, wherein each servo track comprises a plurality of servo sectors, and a head actuated over the disk, the method comprising:
    measuring a position y of the head based on the servo sectors;
    adjusting the measured position y of the head based on:

$$z1=y+c1(y)$$

where $z1$ represents a first adjusted position and $c1(y)$ represents first correction values;
    adjusting the first adjusted position z1 based on:

$$z2=z1+c2(z1)$$

where $z2$ represents a second adjusted position and $c2(z1)$ represents second correction values;
    combining the first and second correction values based on:

$$c3(y)=c1(y)+c2(y+c1(y)); \text{ and}$$

adjusting the measured position y of the head based on:

$$z3=y+c3(y)$$

where $z3$ represents a third adjusted position comprising the adjustment based on $c1(y)$ and the adjustment based on $c2(y)$, and $c3(y)$ represents third correction values.

12. The method as recited in claim 11, further comprising actuating the head over the disk based on at least one of $c3(y)$ and z3.

13. The method as recited in claim 11, wherein the first, second and third correction values compensate for a non-linearity of the head.

14. The method as recited in claim 11, wherein c1 comprises a function of y, c2 comprises a function of z1, and C3 comprises a function of y.

15. The method as recited in claim 11, wherein c1 comprises a first table indexed by y, c2 comprises a second table indexed by z1, and c3 comprises a third table indexed by y.

16. The method as recited in claim 15, wherein the first table is generated using a function of y, the second table is generated using a function of z1, and the third table is generated by combining the first table and the second table.

17. The method as recited in claim 16, wherein for a specific value Y for the measured position y, the corresponding third table value for C3 is generated based on:

$$c3[Y]=c1[Y]+c2[Y+c1[Y]]$$

where c1[Y] represents the first table value and c2[Y+c1[Y]] represents the second table value.

18. The method as recited in claim 11, further comprising iteratively adapting the correction values.

19. The method as recited in claim 18, further comprising iteratively adapting the correction values for a predetermined number of iterations.

20. The method as recited in claim 18, further comprising iteratively adapting the correction values until an average amplitude of c2(z1) falls below a threshold.

\* \* \* \* \*